Aug. 5, 1969   MASUMI HIRAIWA ET AL   3,459,650
PROCESS FOR THE PURIFICATION OF AMINO ACIDS
Filed Jan. 12, 1966
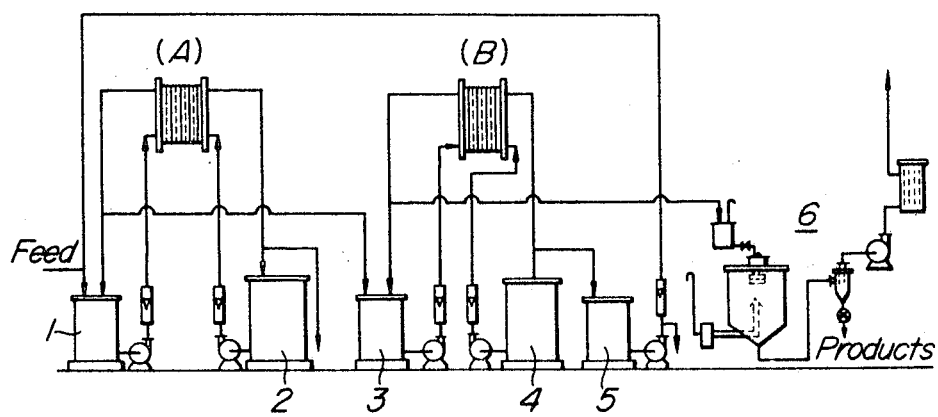
INVENTORS
Masumi Hiraiwa
Tadasi Takahasi
Wataru Fukuda
BY Stevens, Davis, Miller & Mosher
ATTORNEYS United States Patent Office 3,459,650
Patented Aug. 5, 1969

3,459,650
PROCESS FOR THE PURIFICATION
OF AMINO ACIDS
Masumi Hiraiwa and Tadasi Takahasi, Takarazuka-shi, and Wataru Fukuda, Fuse-shi, Japan, assignors to Sumitomo Chemical Company, Ltd., Higashi-ku, Osaka, Japan, a corporation of Japan
Filed Jan. 12, 1966, Ser. No. 520,267
Int. Cl. B01d 13/02
U.S. Cl. 204—180                2 Claims

ABSTRACT OF THE DISCLOSURE

Purification of a neutral amino acid obtained by the Strecker method or amination of a halogenated carboxylic acid which contains contaminating organic and inorganic materials by passing the same consecutively through two electrodyalysis zones at regulated flow rates where strongly acidic cation-exchange membranes and anion-exchange are arranged alternatively between anode and cathode and then spray drying to obtain a purified crystalline neutral amino acid.

This invention relates to a process for the purification of amino acids. More particularly it relates to an improved process of separating, by electrodialysis, an amino acid in high purity from a crude amino acid aqueous solution prepared by organic synthetic method.

Amino acids obtained by the synthetic methods contain generally a considerable amount of inorganic salts and more or less organic intermediate materials. In order to remove these impurities and to obtain high purity amino acids on commercial scale, various processes have been attempted hitherto. They required complicated purification steps and were never satisfactory. Although electrodialysis methods have been proposed, such methods are not so satisfactory as yet for a crude amino acid aqueous solution prepared by organic synthetic method, the solution containing several inorganic salts and organic intermediate materials having molecular weight as large as the amino acid.

One object of the present invention is to provide a simple and economic process for purifying, by electrodialysis, amino acid in high purity from crude amino acid aqueous solution obtained by commercial organic synthesis.

Another object is to provide a process for purifying, by electrodialysis, particularly, methionine in high purity.

Other objects and advantages of the present invention will be apparent from the following description.

According to the present invention, a crude amino acid aqueous solution, prepared by organic synthesis, which contains contaminating inorganic and organic materials, is fed into the first electrodialysis zone, wherein strongly acidic cation-exchange membranes and strongly basic anion-exchange membranes are alternatively placed between anode and cathode, the number of cation-exchange membranes and that of the anion-exchange membranes being equal, to remove contaminating inorganic salts such as sodium chloride and ammonium chloride, and then the amino acid aqueous solution having been subjected to the primary purification at the first electrodialysis zone is fed into the second electrodialysis zone the same as the first electrodialysis zone to take off contaminating organic materials. Thus obtained purified solution is spray-dried to obtain highly pure crystalline desired amino acid.

The amino acids to be purified according to the present invention may be any of neutral, acidic and basic amino acids, so long as they are prepared by organic synthetic methods.

Examples of the amino acids to be treated include alanine, arginine, asparagine, aspartic acid, citrulline, cysteine, cystine, diiodotyrosine, glutamic acid, glutamine, glycine, histidine, hydroxylysine, hydroxyglutamic acid, hydroxyproline, isoleucine, leucine, lysine, methionine, norleucine, ornithine, phenylalanine, proline, serine, threonine, thyroxine, tryptophan, tyrosine and valine. The process of the present invention is preferably applied to the purification of the neutral amino acids, especially, to the purification of methionine. The organic synthetic methods are Strecker methods, amination of halogen acid and the like. The amino acids prepared by fermentation are not included to be purified by the present process because they are accompanied by a great amount of high molecular weight organic impurities.

The contaminating impurities to be removed are, for example, sodium chloride, and ammonium chloride, or sodium sulfate and ammonium sulfate as the inorganic materials, and as the organic materials, hydantoin and ureide in case of methionine, acetic acid and chloroacetic acid in case of glycine and aminopropionitrile and dipropionitrile in case of alanine.

Diaphragms to be employed in the process of the present invention are strongly acidic cation-exchange membrane, which contains sulfonic acid group, and strongly alkaline anion-exchange membrane, which containing quaternary ammonium group. The cation-exchange membrane has the following values of properties; effective resistance, lower than 14Ω/cm.$^2$; transference number, higher than 0.90 as sodium ion; and bursting strength, higher than 4 kg./cm.$^2$. The anion-exchange membrane has the following values of properties; effective resistance, lower than 9Ω/cm.$^2$; transference number, higher than 0.92 as chlorine ion; and bursting strength, higher than 4 kg./cm.$^2$.

In electrodialysis employing ion-exchange membrane for the purification of amino acids, the industrial advantage depends upon selective permeability between the amino acids and the inorganic and organic impurities. The selective permeability is influenced by factors such as pH of solution, temperature and concentration of solution to be treated, current density and voltage, membrane water content and the like.

In carrying out the process of the present invention, into the first electrodialysis zone, there is fed a crude amino acid aqueous solution, the flow rate of which is 0.2–0.3 m.$^3$/hr·m.$^2$, pH of which being isoelectric points, and temperature of which is 10°–30° C. preferably 15°–25° C. The concentration of the amino acid aqueous solution to be fed into the first electrodialysis zone is controlled to be a value lower than the value of about nine tenths of the solubility of the amino acid at that pH and the temperature, so that the concentration of the amino acid aqueous solution from the first electrodialysis zone becomes a value lower than the solubility of the amino acid at that pH and the temperature. In case of methionine, for example, the concentration of methionine in the crude methionine aqueous solution to be fed in the first electrodialysis zone is about 2–7 wt. percent and the concentration of the inorganic materials such as sodium chloride and ammonium chloride is about 3–6 wt. percent.

The current density of the first electrodialysis zone is 1–5 amp./dm.$^2$. At the end point of the primary purification at the first electrodialysis zone, the specific resistance of the amino acid aqueous solution reaches 250–300Ω cm.

In the second electrodialysis zone, the pH, the temperature and the concentration of the amino acid aqueous solution are the same as those of the first dialysis zone, and the flow rate is 0.1–0.2 m.$^3$/hr. m.$^2$ and the current density is 0.01–1 amp./dm.$^2$. At the end point of the secondary purification at the second electrodialysis zone, the current density reaches 0.01–0.05 amp./dm.$^2$ and the specific resistance reaches 2000–3000Ω cm.

The process of the present invention may be applied in any system of batch, semi-continuous and continuous systems.

The process of the present invention will be illustrated with reference to the FIG. 1, which is a continuous process flow-sheet which being one embodiment of the present invention. An amino acid aqueous solution obtained finally in the organic synthetic method is fed via vessel 1 into the first electrodialyzer A, wherein the primary purification is conducted.

The amino acid aqueous solution having been subjected to the primary purification at the first electrodialyzer A is recycled into the vessel 1, while a part of the solution fed, via vessel 3, into the second electrodialyzer B, wherein secondary purification is conducted. The waste liquid from the first electrodialyzer A is passed into vessel 2 and is used as electrode liquid of electrodialyzers A and B, and then is purged, while the waste liquid is recycled as discharge side liquid of the electrodialyzer A.

The amino acid aqueous solution having been subjected to the secondary purification at the second electrodialyzer B is recycled into the vessel 3, while a part of the solution is fed into a spray dryer 6, wherein the solution is spray-dried to obtain highly pure amino acid crystals.

In case of methionine, for example, pure methionine as pure as more than 97% by weight is obtained. The waste liquid from the second electrodialyzer B is passed via vessel 4 into feed back vessel 5 from the vessel 4 the waste liquid is recycled as discharge side liquid of the electrodialyzer B and from the vessel 5 the waste liquid is purged, while a part of the liquid is recycled into the vessel 1 to increase yield of amino acid.

The following examples are given by way of illustration only and it is not intended to limit the invention to the examples.

Example 1

A crude methionine aqueous solution obtained finally by Strecker reaction from β-methylmercaptopropionaldehyde, have the following composition and pH value:

|  | Percent by weight |
| --- | --- |
| Methionine | 2.5 |
| 5-β-methylmercaptoethylhydantoin | 0.05 |
| 5-β-methylmercaptoethylureide | 0.2 |
| Methionine sulfoxide | 0.02 |
| NaCl | 4 |
| NH$_4$Cl | Trace |
| H$_2$O | Remainder |
| pH | 5.5 |

The above solution is purified according to the process flow sheet shown in the FIG. 1. The solution is fed via vessel 1 into the first electrodialyzer A, wherein primary purification is conducted. The temperature is 30° C., average flow rate is 0.3 m.$^3$/hr. m.$^2$. and the current density varies in a range of 3–1 amp./dm.$^2$. When the specific resistance of the solution reaches 300Ω cm. (25° C.) the primary purification is finished, and the solution is fed via vessel 3 into the second electrodialyzer. In the primary purification step, about 95% of sodium chloride and the total amount of ammonium chloride are removed. As the discharge side liquid and the electrode liquid in the first electrodialyzer, 1% sodium chloride aqueous solution is recycled via vessel 2. In the second electrodialyzer, the temperature is 30° C., pH is 5.5, average flow rate is 0.15 m.$^3$/hr. m.$^2$ and the current density varies in a range of 1–0.01 amp./dm.$^2$. Discharge side liquid in the electrodialyzer B is recycled via vessel 4 while a part of the liquid is recycled via vessel 5 into the vessel 1 and a part of the liquid is purged. The electrode liquid in the electrodialyzer B is the same as in the electrodialyzer A.

When the specific resistance of the solution reaches 2500Ω cm. (25° C), the secondary purification is finished, at which the solution contains 4% by weight of methionine, lower than 0.01% by weight of sodium chloride, a trace of organic intermediate. The solution is fed into the spray-drier 6, and the thus obtained methionine crystals are 97% by weight in purity, and 97% in yield based on the methionine content in the feed crude methionine aqueous solution.

Example 2

A crude glycine aqueous solution obtained by organic synthetic method from monochloroacetic acid and ammonia as starting materials, contains 2 weight percent of glycine, 6 weight percent of ammonium chloride, 0.5 weight percent of sodium acetate, a trace of acetic acid and a trace of monochloroacetic acid. The solution is purified in similar way as in Example 1, with the following treating conditions.

Primary purification:
  Feed liquid pH _____ 6.0.
  Treating temperature _____ 20° C.
  Average flow rate _____ 0.25 m.$^3$/hr.m.$^2$.
  Current density _____ 2.5–0.5 amp./dm.$^2$.
  Specific resistance at the end
    point _____ 200Ω cm. at 25° C.
Secondary purification:
  Liquid pH _____ 6.0.
  Treating temperature _____ 20° C.
  Average flow rate _____ 0.1 m.$^3$/hr.m.$^2$.
  Current density _____ 0.5–0.05 amp./dm.$^2$.
  Specific resistance at the end
    point _____ 1500Ω cm. at 25° C.

The thus obtained glycine crystals are 97% by weight in purity and 95% in yield based on the glycine content in the feed crude glycine aqueous solution.

Example 3

A crude alanine aqueous solution finally obtained by organic synthetic method from aminopropionitrile as a starting material, contains 5 weight percent of alanine, a small amount of aminopropionitrile, a small amount of diaminopropionitrile, 8 weight percent of sodium chloride, and 15 weight percent of ammonium chloride. The solution is purified in similar way as in Example 1, with following treating conditions.

Primary purification:
  Feed liquid pH _____ 6.0.
  Treating temperature _____ 25° C.
  Average flow rate _____ 0.3 m.$^3$/hr. m.$^2$.
  Current density _____ 5–1 amp./dm.$^2$.
  Specific resistance at the end
    point _____ 200Ω cm. at 25° C.
Secondary purification:
  Liquid pH _____ 6.0.
  Treating temperature _____ 25° C.
  Average flow rate _____ 0.1 m.$^3$/hr.m.$^2$.
  Current density _____ 1–0.05 amp./dm.$^2$.
  Specific resistance at the end
    point _____ 1700Ω cm. at 25° C.

The thus obtained alanine crystals are 95% by weight in purity and 95% in yield based on the alanine content in the feed crude glycine aqueous solution.

What we claim is:

1. A process according to claim 2 wherein the amino acid is methionine.

2. A process for purifying a neutral amino acid, which comprises feeding a crude neutral amino acid aqueous solution prepared by the Strecker method or amination of a halogenated carboxylic acid, which contains contaminating inorganic and organic materials and has a pH corresponding to isoelectric points of said solution and a temperature of 10°–30° C., into a first electrodialysis zone at a flow rate of 0.2–0.3 m.$^3$/hr.m.$^2$, wherein strongly acidic cation-exchange membranes and strongly basic anion-exchange membranes are alternately placed between anode and cathode, the strongly acidic cation-exchange membranes having an effective resistance lower than 14Ω/cm.$^2$; transference number higher than 0.90 as sodium ion; and bursting strength higher than 4 kg./cm.$^2$, and the strongly basic anion-exchange membranes having an effective resistance lower than 9Ω/cm.$^2$; transference number higher than 0.92 as chlorine ion; and bursting strength higher than 4 kg./cm.$^2$, and the number of the cation-exchange membranes and that of the anion-exchange membranes being equal, and the current density of the electrodialysis zone being 1–5 amp./dm.$^2$, continuing the electrodialysis till the specific resistance of the amino acid aqueous solution reaches 250–300Ω cm., to remove contaminating inorganic salts such as sodium chloride, ammonium chloride, sodium sulfate and ammonium sulfate and feeding the neutral amino acid aqueous solution having been subjected to the primary purification at the first electrodialysis zone into a second electrodialysis zone similar to the first electrodialysis zone at a flow rate of 0.1–0.2 m.$^3$/hr.m.$^2$, the current density of the second electrodialysis zone being 0.01 to 1 amp./dm.$^2$, continuing the electrodialysis till the specific resistance of the amino acid aqueous solution reaches 2,000–3,000Ω cm., to remove contaminating organic materials such as hydantoin, ureide, acetic acid, chloroacetic acid and aminopropionitrile, and then spray-drying the thus obtained purified solution to obtain the desired highly pure crystalline neutral amino acid.

References Cited

UNITED STATES PATENTS

| | | | |
|---|---|---|---|
| 3,231,485 | 1/1966 | Kuwata et al. | 204—180 |
| 3,330,749 | 7/1967 | Kuwata et al. | 204—180 |

JOHN H. MACK, Primary Examiner

A. C. PRESCOTT, Assistant Examiner